US006788850B2

(12) United States Patent
Albrecht et al.

(10) Patent No.: US 6,788,850 B2
(45) Date of Patent: Sep. 7, 2004

(54) CONFIGURATION FOR MULTIPLEXING AND/OR DEMULTIPLEXING THE SIGNALS OF AT LEAST TWO OPTICAL WAVELENGTH CHANNELS

(75) Inventors: Helmut Albrecht, München (DE); Ingo Baumann, Zorneding (DE); Gerhard Heise, Neubiberg (DE); Zhan Gao, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/135,678

(22) Filed: Apr. 30, 2002

(65) Prior Publication Data

US 2002/0159697 A1 Oct. 31, 2002

Related U.S. Application Data

(63) Continuation of application No. PCT/DE01/01670, filed on Apr. 30, 2001.

(51) Int. Cl.[7] .............................................. G02B 6/34
(52) U.S. Cl. ........................................ 385/37; 385/24
(58) Field of Search ............................. 385/15, 24, 37, 385/123, 129–134; 398/48, 49, 106, 115–125; 359/115, 124–134

(56) References Cited

U.S. PATENT DOCUMENTS

| 3,589,793 | A | * | 6/1971 | Curtiss | 385/116 |
|---|---|---|---|---|---|
| 4,106,847 | A | * | 8/1978 | Arnaud | 385/124 |
| 4,205,901 | A | * | 6/1980 | Ramsay et al. | 385/124 |
| 4,480,897 | A | * | 11/1984 | Okamoto et al. | 385/11 |
| 4,737,004 | A | * | 4/1988 | Amitay et al. | 385/43 |
| 4,784,454 | A | * | 11/1988 | Dyott | 385/31 |
| 5,058,978 | A | * | 10/1991 | Kondoh et al. | 385/43 |

(List continued on next page.)

FOREIGN PATENT DOCUMENTS

| DE | 198 15 404 A1 | 10/1999 | |
|---|---|---|---|
| WO | WO 96/00915 | 1/1996 | |
| WO | WO 99/52003 | * 10/1999 | ........... G02B/6/293 |

OTHER PUBLICATIONS

M.R. Amersfoort et al.: "Phased–array wavelength demultiplexer with flattened wavelength response", *Electronics Letters*, Feb. 17, 1994, vol. 30, No. 4, pp. 300–301.
A. Rigny et al.: "Double–Phased Array For A Flattened Spectral Response", *ECOC 97*, Sep. 22–25, 1997, *Conference Publication No. 448, IEE*, 1997, pp. 79–82.
K. Okamoto et al.: "Flat spectral response arrayed–waveguide grating multiplexer with parabolic waveguide horns", *Electronics Letters*, Aug. 29, 1996, vol. 32, No. 18, pp. 1661–1662.
K. Okamoto et al.: "Arrayed–waveguide grating multiplexer with flat spectral response", *Optics Letters*, Jan. 1, 1995, vol. 20, No. 1, pp. 43–45.
Soole, J. B. D. et al.: "Use of Multimode Interference Couplers to Broaden the Passband of Wavelength–Dispersive Integrated WDM Filters", IEEE, XP 000628952, vol. 8, No. 10, Oct. 1996.

*Primary Examiner*—Akm Enayet Vllah
*Assistant Examiner*—Michelle R. Connelly-Cushwa
(74) *Attorney, Agent, or Firm*—Laurence A. Greenberg; Werner H. Stemer; Gregory L. Mayback (57) ABSTRACT

A configuration for multiplexing and/or demultiplexing the signals of at least two optical wavelength channels, is described. Provided in this case is a grating device having an optical grating, a first optical free beam region and a second optical free beam region. Accordingly, radiation is coupled into and out of the first free beam region via a coupling device which effects a flattening and/or widening of the field distribution of the light coupled in or out, at least in the plane of the first free beam region. This permits a transmission characteristic of the configuration to be flattened.

10 Claims, 6 Drawing Sheets

U.S. PATENT DOCUMENTS

| | | | |
|---|---|---|---|
| 5,133,794 A | * 7/1992 | Bachmann et al. | 65/403 |
| 5,412,744 A | 5/1995 | Dragone | |
| 5,594,825 A | * 1/1997 | Kawasaki et al. | 385/60 |
| 5,680,236 A | * 10/1997 | Van Der Tol | 359/127 |
| 5,706,377 A | * 1/1998 | Li | 385/37 |
| 5,732,171 A | 3/1998 | Michel et al. | |
| 5,837,334 A | * 11/1998 | Yokokawa et al. | 428/34.4 |
| 6,094,515 A | * 7/2000 | Miki et al. | 385/31 |
| 6,125,225 A | * 9/2000 | Dianov et al. | 385/124 |
| 6,141,152 A | * 10/2000 | Trouchet | 359/634 |
| 6,222,956 B1 | * 4/2001 | Akiba et al. | 385/24 |
| 6,244,757 B1 | * 6/2001 | Kim et al. | 385/96 |
| 6,289,147 B1 | * 9/2001 | Bulthuis et al. | 385/24 |
| 6,304,687 B1 | * 10/2001 | Inoue et al. | 385/14 |
| 6,321,006 B2 | * 11/2001 | Wu | 385/28 |
| 6,349,162 B1 | * 2/2002 | Shiraishi et al. | 385/124 |
| 6,374,013 B1 | * 4/2002 | Whiteaway et al. | 385/37 |
| 6,442,311 B1 | * 8/2002 | Barbarossa et al. | 385/37 |
| 6,549,696 B1 | * 4/2003 | Uetsuka et al. | 385/24 |
| 6,701,043 B2 | * 3/2004 | Delisle et al. | 385/37 |

* cited by examiner

CONFIGURATION FOR MULTIPLEXING AND/OR DEMULTIPLEXING THE SIGNALS OF AT LEAST TWO OPTICAL WAVELENGTH CHANNELS

CROSS-REFERENCE TO RELATED APPLICATION

This application is a continuation of copending International Application No. PCT/DE01/01670, filed Apr. 30, 2001, which designated the United States and was not published in English.

BACKGROUND OF THE INVENTION

Field of the Invention

The invention relates to a configuration for multiplexing and/or demultiplexing the signals of at least two optical wavelength channels. The configuration contains an optical grating device for transforming a first optical power of each of the channels. The optical grating device has a specific common region of space assigned in common to all of the channels to which the first optical power is fed and is transformed into a second optical power that is concentrated in each case to one of a plurality of specific separate regions of space each assigned to one of the channels alone, and vice versa. The optical grating device contains an optical grating, a first optical free beam region disposed between the specific common region of space assigned in common to all of the channels and the optical grating, a second optical free beam region disposed between the optical grating and each of the specific separate regions of space are each assigned to one of the channels alone, and a coupling device for coupling light into or out of all of the channels into the first free beam region. The light coupled in or out traverses the specific common region of space assigned in common to all of the channels. A plurality of waveguides is provided. One of the waveguides is assigned to each of the channels alone, the waveguides are coupled in each case to the second free beam region.

A multiplexing/demultiplexing configuration of the generic type is disclosed, for example, in International Patent Disclosure WO 96/00915. The configuration described there has a grating device that is used both to separate and to combine the wavelength channels. The grating device has an optical grating, an optical free beam region that is disposed between a point in space assigned in common to all channels, and the optical grating, and an optical free beam region that is disposed between the optical grating and each point in space assigned one channel alone.

In a particular embodiment of this type, the optical grating contains a phased array, that is to say of a plurality of strip-shaped optical waveguides, each of which has a first end face which faces the point in space assigned in common to all channels, and a second end face which faces the points in space, to each of which one channel each is alone assigned. An optical length between the first end face and the second end face varies from waveguide to waveguide.

If, as a demultiplexer, the particular embodiment is operated in the case of which the channels are spatially separated, the first end faces of the waveguides of the phased array form entrance apertures of the grating, and the second end faces of the waveguides form exit apertures of the grating. When this embodiment is operated as a multiplexer, in the case of which the spatially separated channels are combined, the second end faces of the waveguides of the phased array form entrance apertures of the grating, and the first end faces of the waveguides form exit apertures of the grating. The waveguides of the phased array act in all cases as optical phase gratings.

Instead of a grating in the form of a phased array, it is also possible to use other optical gratings, for example etched gratings (see IEEE, Photonics Technology Lett., Vol. 8, No. Oct. 10, 1996, pages 1340 to 1342).

The grating device of such a configuration determines a wavelength-dependent transmission function of each strip-shaped optical waveguide that is assigned to one channel alone and/or to all channels in common, and an end face that faces the grating device and is disposed at the point in space that is assigned to one channel alone or all channels in common. The transmission function is a Gaussian function, at least to a first approximation (see the above-mentioned IEEE document).

A more rectangular profile of the wavelength-dependent transmission function of such a waveguide would be more favorable such that in the event of fluctuations in the ambient temperature and/or wavelength the insertion loss of the waveguide changes only insignificantly in a certain wavelength region.

Various possibilities have been described for flattening the inherent quasi-Gaussian transmission function of such a waveguide, that is to say for shaping it in a more rectangular fashion.

Thus, it is known from Electr. Lett., 30, 1994, pages 300–301 to configure the waveguide assigned to one channel alone not, as customary, as a monomode waveguide, but as a multimode waveguide in order to flatten the transmission function thereof.

It is known from Proc. ECOC, Birmingham 1997, Conference Publication No. 448, IEEE 1997, pages 79, 82 to interleave two slightly different phased arrays with one another such that in the case of the point in space of the configuration that is assigned to one channel alone two quasi-Gaussian transmission functions specifically displaced spectrally are superimposed on one another to form a broader flattened transmission function.

It is also known to configure a configuration such that in the case of the point in space of the configuration that is assigned to all the channels in common two mutually overlapping quasi-Gaussian transmission functions are present that can be implemented with the aid of a 3-dB beam splitter (see U.S. Pat. No. 5,412,744), with the aid of what is termed a multimode interference coupler (see above-mentioned IEEE document) and/or with the aid of what is termed a horn structure (see Electr. Lett. 32, 1996, pages 1661–1662). The flattened transmission function, produced at this point in space, in the form of the two overlapping quasi-Gaussian transmission functions is projected by the grating device onto each point in space of the configuration that is assigned to one channel alone.

In the case of the three last mentioned implementations, the decisive flattening operation is the formation of a convolution integral from an electric field distribution in accordance with the overlapping quasi-Gaussian transmission functions with the Gaussian-type mode of each waveguide assigned to one channel alone.

It is known from Optics Lett. 20, 1995, pages 43–45 to change the electric field distribution in the case of the second end faces, forming the exit apertures of the grating, of the waveguides of the phased array. The basis of this implementation is that the free beam region disposed between the end faces and the separate points in space each assigned to one channel alone has a lens effect, and the electric field distribution at the end faces and the electric field distribution at the separate points in space are therefore linked via a Fourier transformation. Through suitable selection of the cross section of the waveguides of the phased array and an additional change to the optical length of the waveguides, it is possible to produce an electric field distribution with, correspondingly, the sin(x)/x function at the second end faces of the waveguides, which function is transformed by the Fourier transformation into a rectangular field distribution at a separate point in space.

Finally, International Patent Disclosure WO 99/52003 describes a configuration for spatial separation and/or combination of at least two optical wavelength channels having an optical phased array device that has a device for generating an attenuation function for a wavelength-dependent attenuation of the transmission function of at least one of the waveguides. Consequently, a suitable field distribution is subtracted from the field distribution of the uninfluenced phased array. This cuts off the top part of the transmission curve.

SUMMARY OF THE INVENTION

It is accordingly an object of the invention to provide a configuration for multiplexing and/or demultiplexing the signals of at least two optical wavelength channels which overcomes the above-mentioned disadvantages of the prior art devices of this general type, which configuration provides a rectangular or flatter profile of the filter curves for the individual wavelengths.

With the foregoing and other objects in view there is provided, in accordance with the invention, a configuration for multiplexing and/or demultiplexing signals of at least two optical wavelength channels. The configuration contains an optical grating device for transforming a first optical power of each of the channels. The optical grating device has a plurality of specific separate regions of space and a specific common region of space assigned in common to all of the channels to which the first optical power is fed and transformed into a second optical power that is concentrated in each case to one of the specific separate regions of space each assigned to one of the channels alone, and/or vice versa. The optical grating device contains an optical grating, a first optical free beam region disposed between the specific common region of space assigned in common to all of the channels and the optical grating, and a second optical free beam region disposed between the optical grating and each of the specific separate regions of space each assigned to one of the channels alone. A coupling device is provided for coupling light into or out of all of the channels into the first free beam region, the light coupled in or out traversing the specific common region of space assigned in common to all of the channels. The coupling device for coupling the light into and out of the first optical free beam region effecting at least one of a flattening and a widening of a field distribution of the light coupled in or out at least in a plane of the first free beam region. A plurality of waveguides is provided. One of the waveguides is assigned to each of the channels alone, the waveguides are coupled in each case to the second free beam region.

Consequently, the solution according to the invention is distinguished in that the coupling device for coupling light into or out of all the channels in the first free beam region effects a flattening and/or widening of the field distribution of the light coupled in or out, at least in the plane of the free beam region. A flattened and/or widened field distribution (input field distribution) is therefore present in the vicinity of the region in space assigned to all channels.

Since the configuration is of a mirror-image type with respect to the first and second free beam regions, a widened input field distribution in the first free beam region is projected onto the output of the second free beam region at which each wavelength channel is assigned a dedicated region in space. Consequently, a field flattening or field widening is also present in the regions in space of the second free beam region, which are assigned in each case to one channel alone.

Consequently, the filter curve for the individual wavelengths respectively exhibits a rectangular or flatter profile. It follows that in the event of fluctuations in the ambient temperature and/or the wavelength of the laser radiation the insertion loss changes only insignificantly in a relatively large wavelength region.

The invention is based on the idea of undertaking to widen the filter curves of the multiplexer/demultiplexer configuration not measures at the actual multiplexer/demultiplexer, but by measures that vary or widen the input field distribution (or output field distribution). As a result, there is no need to change the geometry and configuration of the actual multiplexer/demultiplexer. The input signal, of enlarged or flattened bandwidth, is projected onto the output symmetrically by the multiplexer/demultiplexer.

In a preferred refinement of the invention, the coupling device contains a waveguide that has an increased core diameter in the region of the coupling onto the first free beam region. Therefore, a mode field diameter of the waveguide is widened for the light coupled in or out in comparison with the mode field diameter of a monomode fiber, and this leads to a widened spatial input field distribution. Consequently, the filter curve of the individual wavelength is also widened.

The waveguide preferably has a continuous enlargement of the core diameter in the region of the coupling onto the first free beam region (tapered fiber). The core diameter is widened by, for example, heating and/or compressing the monomode waveguide and/or causing it to swell.

In an alternative refinement, the coupling device has a waveguide with two parallel waveguide cores spaced apart from one another that are both coupled to the first free beam region. The Gaussian functions of the two waveguide cores are slightly displaced spatially relative to one another in this case and are superimposed on one another to form a widened Gaussian function as an input field distribution that is projected onto the output of the second free beam region by the optical grating device. The two cores in this case preferably have a spacing of 10 to 20 $\mu$m.

In a further refinement of the invention, the coupling device has a waveguide with an elliptical core that likewise leads to a widening of the input field distribution in the first free beam region.

In a further variant of the invention, the coupling device have a Y-coupler, whose single end is coupled to a waveguide, and whose two parallel ends are coupled to the first free beam region. The two parallel ends once again produce in this case two Gaussian functions that are slightly displaced spatially relative to one another and are superimposed on one another to form a widened input field distribution.

The first free beam region of the configuration is preferably disposed at a substrate edge. The coupling device contains in this case a glass fiber that is coupled to the substrate edge in a way known per se. Since a change in the input field distribution of the first free beam region is ascribed solely to measures that are performed in the device for coupling light in and out (optical coupling device), there is advantageously no need to change or adapt the optical grating device formed on the substrate.

The waveguide of the optical coupling device is preferably a monomode glass fiber, since monomode glass fibers transmit the most optical power. In particular, in the optical grating device of the multiplexer/demultiplexer higher modes are radiated in any case, and thus only the fundamental mode is transmitted.

In accordance with a concomitant feature of the invention, the optical grating contains a plurality of strip-shaped optical waveguides. The strip-shaped optical waveguides have first end faces facing the specific common region of space assigned in common to all the channels and second end faces each facing one of the specific separate regions of space to each of which one of the channels is alone assigned. An optical length between each of the first end faces and each of the second end faces varies between the strip-shaped optical waveguides.

Other features which are considered as characteristic for the invention are set forth in the appended claims.

Although the invention is illustrated and described herein as embodied in a configuration for multiplexing and/or demultiplexing the signals of at least two optical wavelength channels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3B is a graph showing a field distribution at an output of the glass fiber shown in FIG. 3a;

DESCRIPTION OF THE PREFERRED EMBODIMENTS

Referring now to the figures of the drawing in detail and first, particularly, to FIGS. 6–9 thereof, there is shown for a better understanding of the invention, a configuration known in the prior art for a spatial separation and/or combination of a plurality of optical wavelength channels (multiplexer/demultiplexer). The exemplary embodiment illustrated in FIGS. 6–9 is a configuration in accordance with the prior art and corresponds to the configuration, described in International Patent Disclosures WO 96/00915 and WO 99/52003, for the spatial separation and/or combination of a plurality of optical wavelength channels $\lambda 1, \lambda 2, \ldots \lambda n$, which are hereby incorporated herein.

Figure 6:
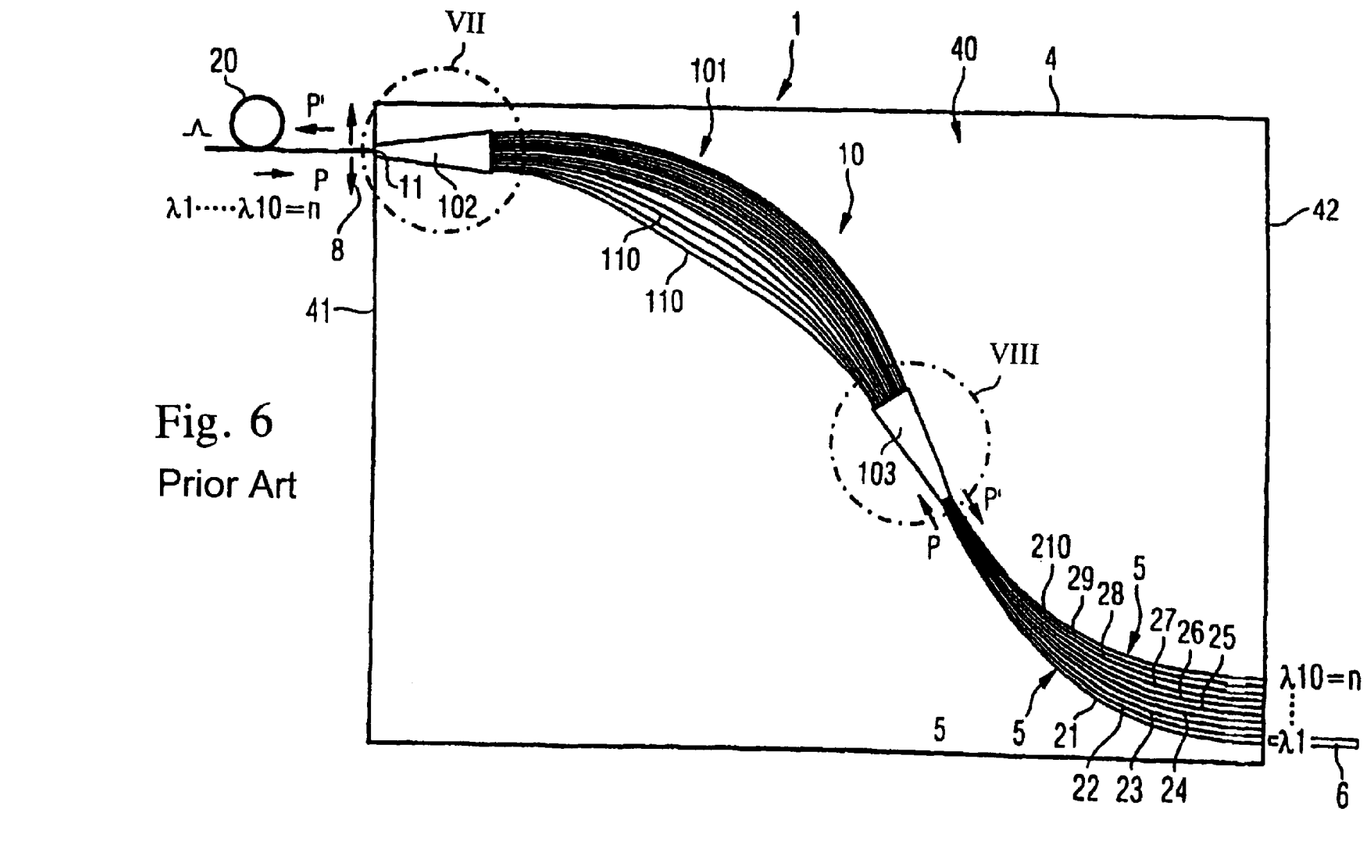
FIG. 6 is a plan view of an optical multiplexer/demultiplexer in accordance with the prior art.

In this context, in the case of the exemplary embodiment illustrated in FIG. 6 there are disposed on a surface 40 of a substrate 4 between one substrate edge 41 and another substrate edge 42 essentially parallel thereto, a first optical free beam region 102 assigned to the substrate edge 41, in the form of a layer waveguide 102, and a second optical free beam region 103, spatially separated from the layer waveguide 102, and assigned to another substrate edge 42, in the form of second layer waveguide 103. An optical phase shift configuration in the form of a phased array 101 made from a plurality of strip-shaped optical waveguides 110 runs in a curve and has an optical length varying from waveguide 110 to waveguide 110 on the substrate 4. A configuration 5 is provided for coupling out or coupling in and is made from a number of strip-shaped optical waveguides $21, 22, \ldots 2n$ that is equal to a number n of the channels $\lambda 1, \lambda 2, \ldots \lambda n$, which, for example, run in an opposite curve to the waveguides 110 of the phased array 101.

Figure 7:
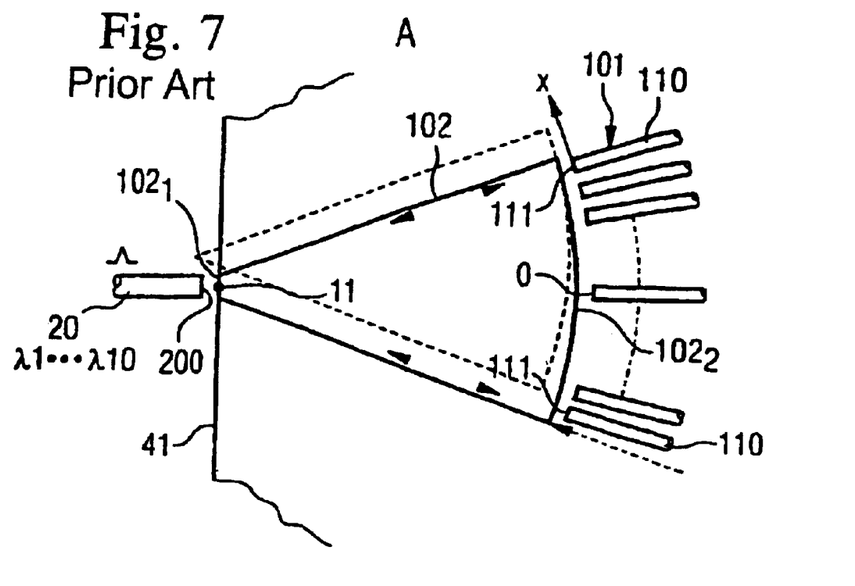
FIG. 7 is an enlarged representation of a detail VII shown in FIG. 6.
Figure 8:
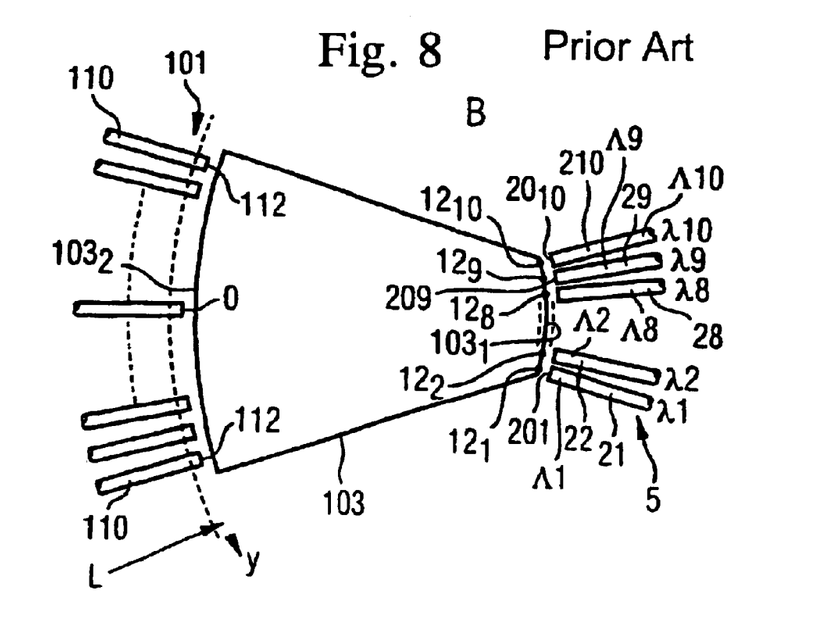
FIG. 8 is an enlarged representation of a detail VIII shown in FIG. 6.

According to FIGS. 7 and 8, each of the strip-shaped optical waveguides 110 has a first end face 111 that is opposite an end face $102_2$ facing the phased array 101 of the first layer waveguide 102 (FIG. 7), and a second end face 112 opposite an end face $103_2$ facing the phased array 101 of the second layer waveguide 103 (FIG. 8).

An optical length L of each the waveguides 110, which varies from waveguide 110 to waveguide 110, is measured between the first end face 111 and the second end face 112 of the waveguide 110, and is defined in each case by the product of an effective refractive index of each waveguide 110 and the longitudinal axial geometric length thereof between the end faces 111 and 112 thereof.

The first layer waveguide 102 has an end face $102_1$ that faces away from the phased array 101 and is terminated, for example, by the substrate edge 41, and in which a point 11 is situated by which all channels $\lambda 1$ to $\lambda 10$ can be coupled into/or out of the one layer waveguide 102.

The other layer waveguide 103 has an end face $103_1$ that faces away from the phased array 101 and faces the configuration 5 for coupling out and/or coupling in, and in which in each case one separate point $12_i$ is situated per channel $\lambda i$ (i=1 to 10), at which alone an optical power P of a channel $\lambda i$ that is concentrated onto the point 11 in the end face $102_1$ of the first layer waveguide 102 and is coupled into the first layer waveguide 102, is reconcentrated from the phased array 101 by the second layer waveguide 103. The point $12_i$ is assigned to the channel $\lambda i$ alone.

Conversely, optical power P of each channel $\lambda i$, that is concentrated at the point $12_i$, assigned to the channel $\lambda i$ alone, in the end face $103_1$ of the second layer waveguide 103 and is coupled into the second layer waveguide 103 is reconcentrated from the phased array 101 by the second layer waveguide 103 at the point 11 in the end face $102_1$ of the first layer waveguide 102. Consequently, the point 11 is assigned to all the channels λi in common. The end face of the glass fiber 11 constitutes the region in space assigned to all the channels in common.

The reconcentrated optical power of one channel λi can deviate from the concentrated optical power P coupled in, and is therefore denoted by P'.

Together with the layer waveguides 102 and 103, the phased array 101 forms an optical grating device 10 of the example according to FIG. 6, the point 11 being the point in space in the grating device 10 that is assigned to all the channels λi in common, and each separate point 2i (i.e. 21–29) being a point in space in the grating device 10 that is assigned to the channel λi alone.

The phased array 101 forms an optical grating 101 in the grating device 10 in the form of a phase grating 101, the first layer waveguide 102 forms the optical free beam region that is disposed between the point in space 11, common to all channels λi, and the optical grating 101, and the second layer waveguide 103 forms an optical free beam region that is disposed between the optical grating 101 and every point $12_i$ assigned the one channel λi alone.

The configuration 5 for coupling out and/or in has, per channel λi, in each case one of the strip-shaped optical waveguides 2i that is assigned to the respective channel λi alone and has an end face 20i that is disposed at the point in space $12_i$ assigned to the channel λi alone, and through which the optical power P', reconcentrated at the point $12_i$, of the channel λi is at least partially coupled into the waveguide 2i when the configuration is operated as a demultiplexer.

Each of the waveguides 2i of the configuration 5 for coupling out and/or in has a wavelength-dependent transmission function Λi that is also determined by the grating device 10.

Figure 9:
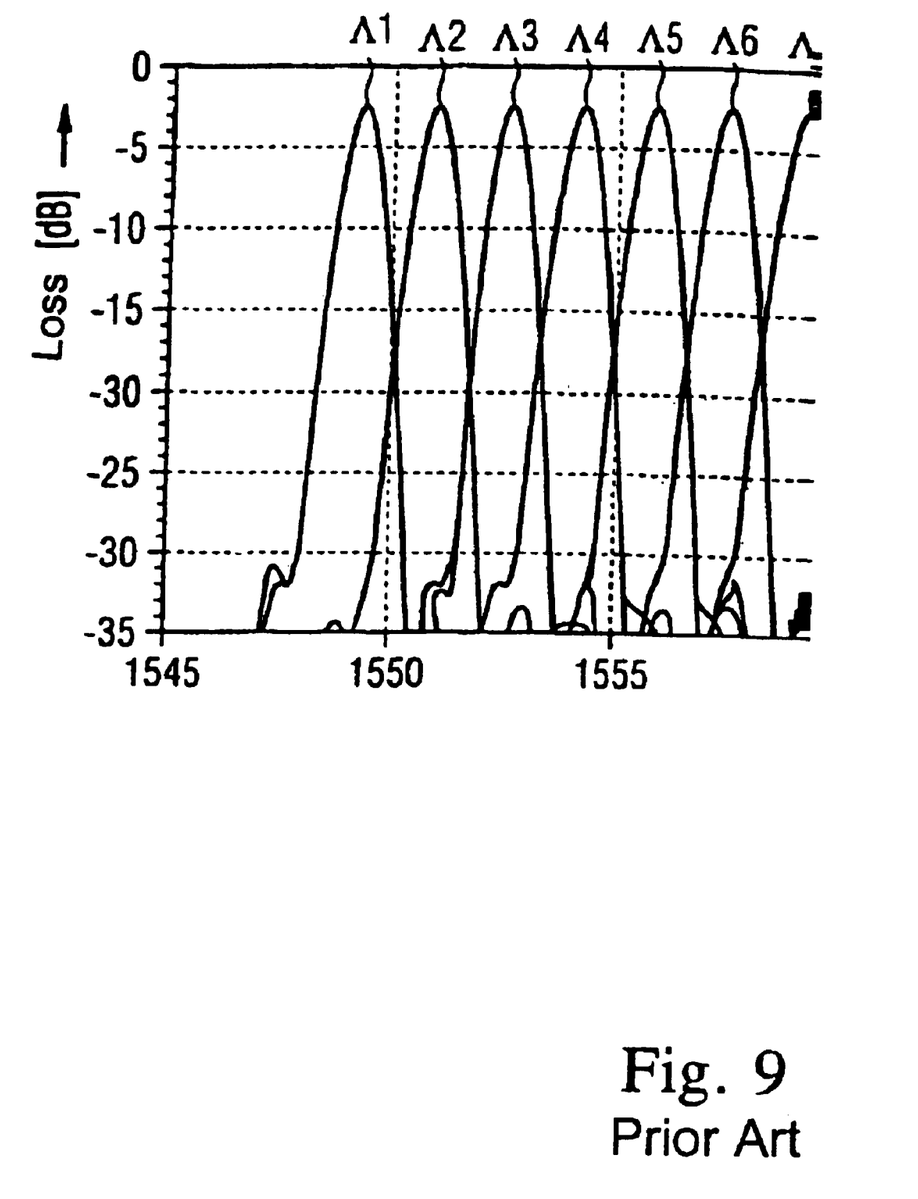
FIG. 9 is a graph of a typical wavelength-dependent transmission functions per channel in the case of the configuration of FIG. 6.

Instead of showing 1 to 10 typical wavelength-dependent transmission functions Λi, FIG. 9 illustrates the configuration 5 for coupling out and/or in of the example according to FIG. 6 for the case i=1 to 8. The optical wavelength λ is plotted on the abscissa, and insertion loss on the ordinate. Each transmission function Λi belongs solely to the waveguide 2i and channel λi. The example is configured for a channel spacing of 200 GHz.

Each of the transmission functions Λi is similar to a Gaussian function.

When the configuration is operated as a demultiplexer, optical power P of each channel λi to be separated is fed through the waveguide 20 to the point in space 11 assigned to all channels in common, and the optical power P', transmitted to the waveguide 2i assigned to the channel λi alone, of the channel λi is extracted from the waveguide 2i. In the case of operation as a multiplexer, the optical power P of each channel λi to be combined is fed through the waveguide 2i, assigned to the channel λi alone, only to the point in space assigned to the channel λi alone, and the optical power P', transmitted to the waveguide 20 assigned to all channels λi, of the channel λi is extracted from the waveguide 20.

In this case, the free beam regions 102 and 103 each have a lens effect and accomplish a Fourier transformation. After coupling into the free beam region 102, an optical field distribution concentrated onto the point in space 11 is distributed spatially onto the first end faces 111, disposed along a line x (FIG. 7), of the waveguides 110 of the phased array 101, the field distribution being linked along the line x with the concentrated field distribution at the point 11.

A portion of the optical power P fed to the first end faces 111 is coupled into each waveguide 110 of the phased array 101 and transmitted to the second end face 112 of the waveguide 110. As a result, there is present in each case at each of the second end faces 112 individual optical field distribution concentrated onto the second face 112. The second end faces 112 are disposed along a line y (FIG. 8). The individual field distributions in the second end faces 112 have along the line y an envelope that is equal to the field distribution along the line x. The second end faces 112 in this case form the exit apertures of the grating 101, the fact being that for each channel λi the optical power P', exiting from all the second end faces 112, of the channel λi is transmitted in the free beam region 103 and concentrated at the point 12i, which is assigned to the channel λi alone.

The optical field distribution concentrated at the point 12i, and the envelope along the line y are linked to one another in each case by a Fourier transform. A similar statement holds for the reverse case, in which the power P emanates from a point 21 and is reconcentrated via an envelope along the line x at the point 11, that is to say in the multiplexing case.

Figure 1A:
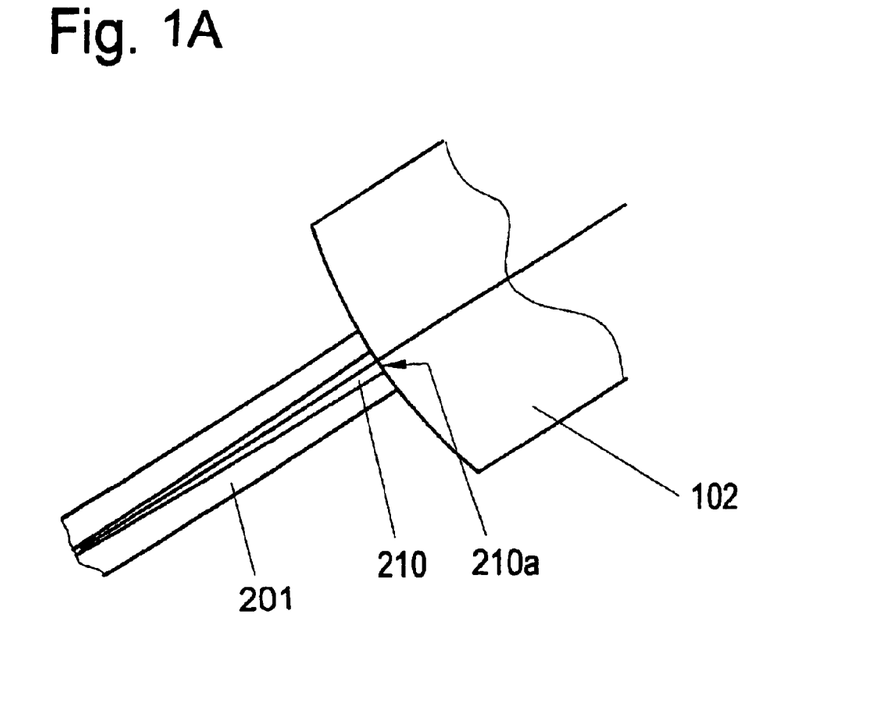
FIG. 1A is a diagrammatic, partial side-elevational view of a coupling device for coupling light into and out of a multiplexer/demultiplexer, the coupling device has a glass fiber with a widened core diameter according to the invention.

Illustrated in FIG. 1A is a coupling device according to the invention that instead of the optical conductor 20 in FIG. 6 couples light into the first free beam region 102. The actual multiplexer/demultiplexer is unchanged.

The coupling device has a monomode optical fiber 201 that is mechanically coupled to the first free beam region 102. For this purpose, the optical fiber 201 is guided up to a non-illustrated minimum gap as far as directly at the substrate surface edge, which the first free beam region 102 is formed on, and the light is immediately directed into the free beam region 102. The optical fiber 201 therefore serves as a fiber for coupling in or, in the case of a reverse beam course, a fiber for coupling out.

Figure 1B:
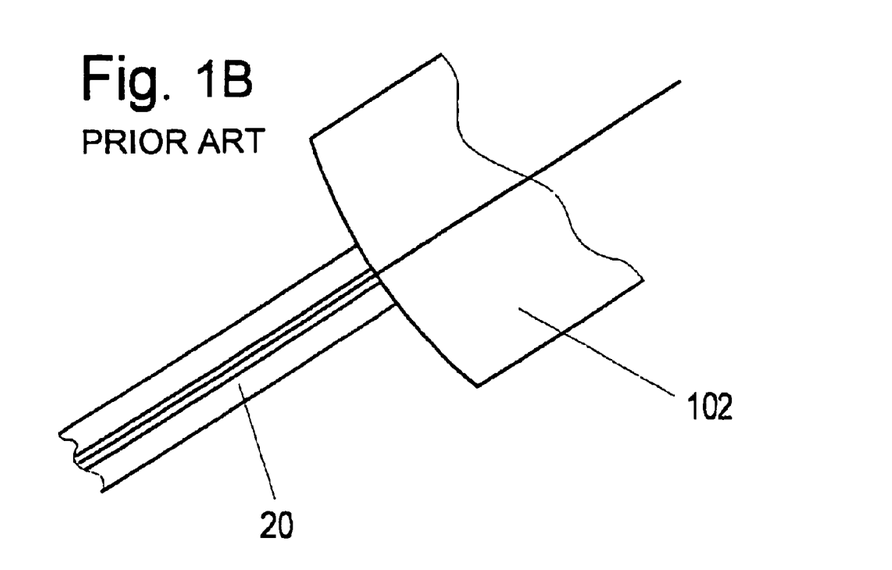
FIG. 1B is a partial, side-elevational view of a prior art coupling device with the glass fiber, which has a standard prior art core diameter.

The core geometry of the optical fiber 201 deviates from the geometry of a standard prior art monomode optical fiber that is illustrated in FIG. 1B for the purpose of comparison. Thus, the optical fibric 201 has a core 210 that widens in the direction of the first free beam region 102, that is to say is tapered. Consequently, an enlarged mode field diameter of the core 210 is present in the region of the coupling onto the first free beam region 102. An end face 210a of the enlarged core 210, from which light is irradiated directly into the first free beam region 102, in this case constitutes the region of space 11 that is assigned to all wavelength channels in common.

Owing to the enlarged mode field diameter of the optical fiber 201 and to the enlarged end face 210a, a widened field distribution is present in the coupling device, and thus at the input of the first free beam region 102. The widened field distribution is projected onto an output of the second free beam region 103 or onto the region of space $12_i$ assigned to each channel λi alone. The result is a desired, flattened transmission characteristic.

Figure 2:
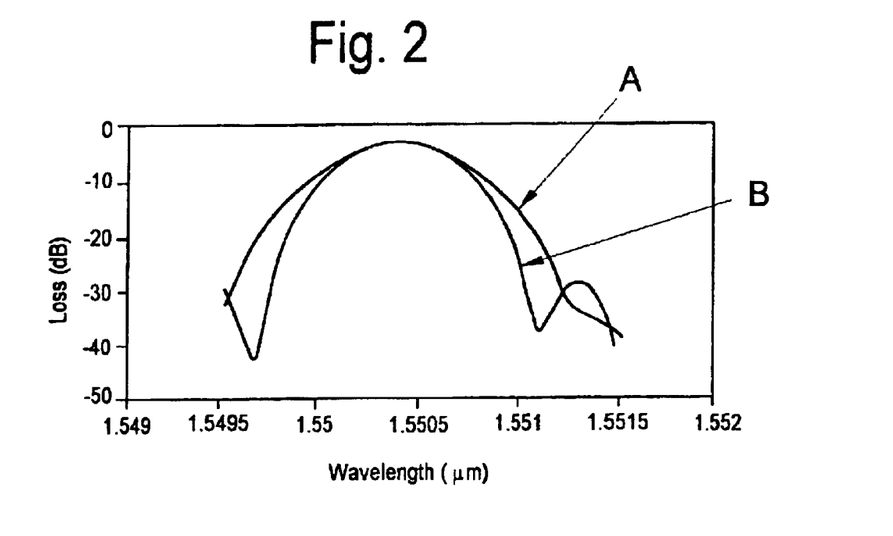
FIG. 2 is a graph showing a filter curve of the multiplexer/demultiplexer having the coupling device in accordance with FIGS. 1A and 1B for one channel.

This is illustrated by way of example in FIG. 2. FIG. 2 shows the insertion loss or transmission curve for a channel in the wavelength region at 1550 nm, first for a standard prior art monomode fiber as the coupling fiber in accordance with FIG. 1B (curve B), and second for the monomode fiber 201 according to the invention with widened mode field diameter in accordance with FIG. 1A (curve A). The diameter of the core 210 in the coupling region being equal to twice the normal diameter, for example, being widened from 10 μm to 20 μm. The result in this case is that the passband (1 dB bandwidth) defined by a 1 dB attenuation is widened from 0.19 nm to 0.23 nm. This corresponds to increasing the passband by approximately 20%.

The production of a widened core region/mode field diameter in the coupling fiber 201 is performed in a way known per se, in particular by heating and/or compressing the optical fiber and/or causing it to swell. For example, the doped core is heated, the doping diffusing into the cladding region, and the core thereby being enlarged. This method can be undertaken advantageously only at desired optical conductor regions, in the present case before the light is coupled into the first free beam region 102.

It may be pointed out that the geometry of the taper is selected such that the power is not substantially changed in the fundamental mode.

Figure 3A:
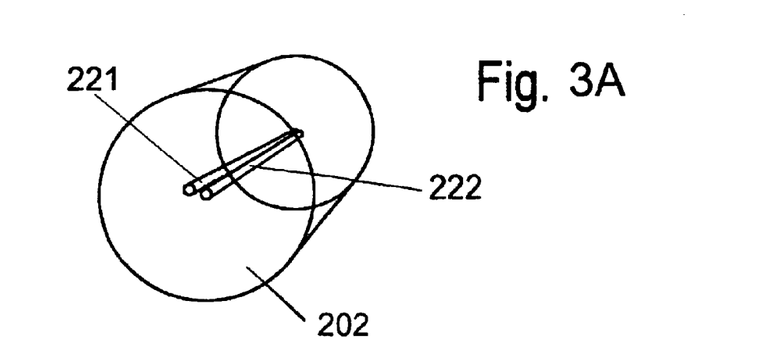
FIG. 3A is a perspective view of a second embodiment of the coupling device according to the invention, the coupling device having a glass fiber with a twin core.

Demonstrated in FIG. 3A is an alternative exemplary embodiment in which the coupling device has a monomode optical fiber 202 that has two light-guiding cores 221, 222. In this case, each core 221, 222 preferably transmits only the fundamental mode.

Figure 3B:
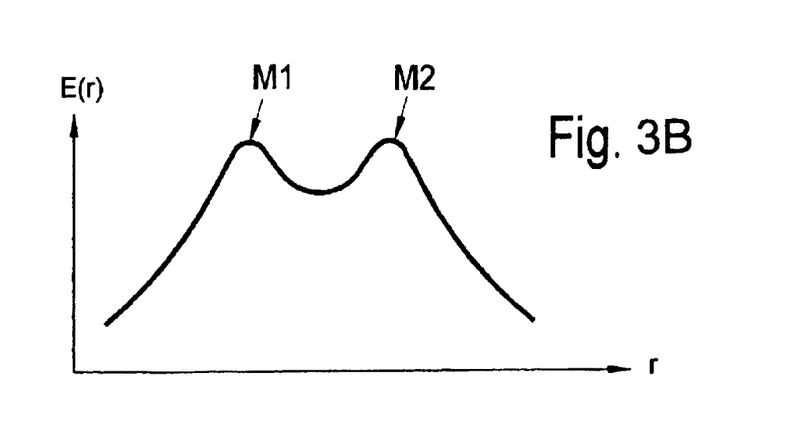

The two light-guiding cores contain the same light signals. The field distributions of the individual cores 221 or 222 are superimposed on one another at the output of the optical fiber 202 and at the input of the first free beam region 102 to form a widened field distribution in accordance with FIG. 3B, that has a double maximum M1, M2. The transmission curve for each channel is therefore widened in comparison with the prior art.

Figure 4:
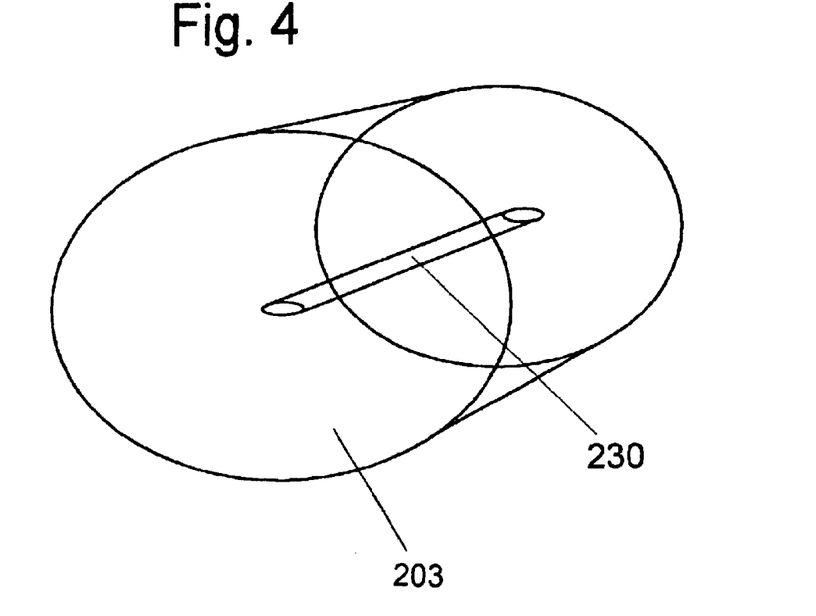
FIG. 4 is a perspective view of a third embodiment of the coupling device according to the invention, the coupling device having a glass fiber with an elliptical core.

It is provided in FIG. 4 to use as the coupling device a monomode optical fiber 203 having a core 230 that is elliptical in section. The light irradiated directly into the first free beam region 102 from the elliptical core 230 has a widened field distribution that, in turn, leads to a widened field distribution and thus to an improved transmission curve.

Figure 5:
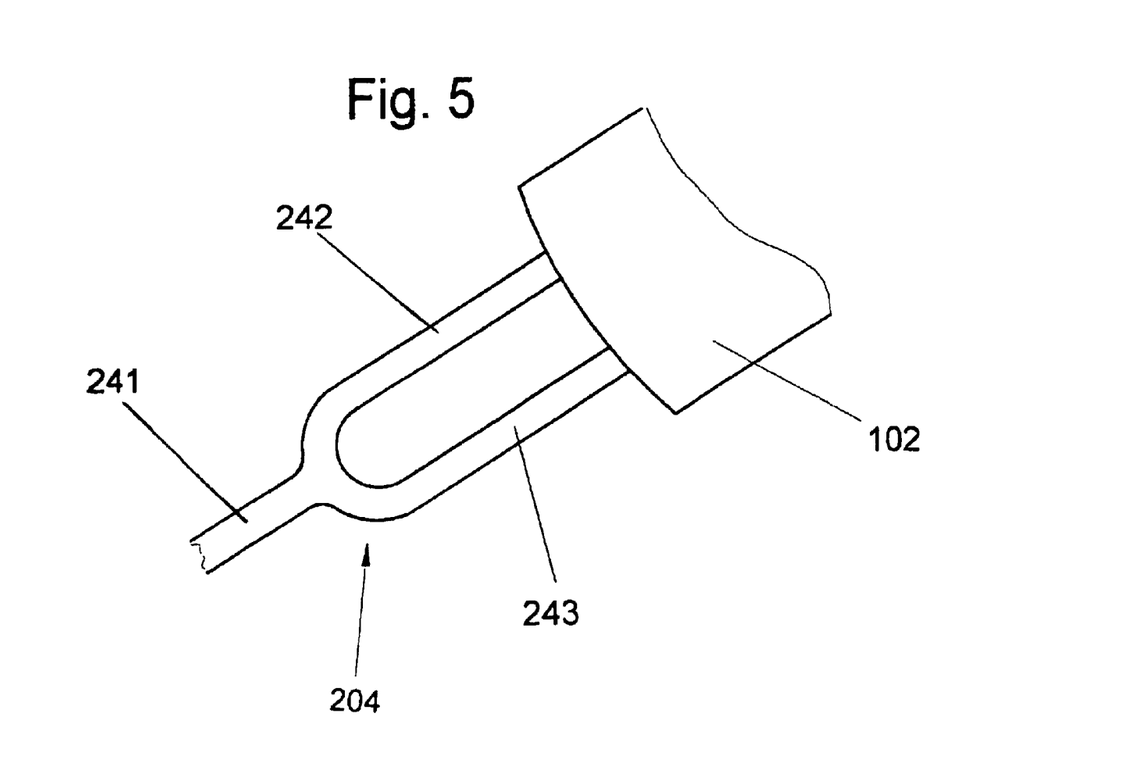
FIG. 5 is a side-elevational view of a fourth embodiment of the coupling device, the coupling device having a Y-coupler.

Illustrated in FIG. 5 is an exemplary embodiment in which the coupling device has a Y-shaped waveguide structure. Provided for this purpose is a Y-coupler 204 whose single end 241 is coupled to a waveguide, and whose two parallel ends 242, 243 are coupled to the first free beam region 102. In a way similar to the exemplary embodiment of FIG. 3A, the result in this case is a widened field distribution that has a double maximum. Different transmission characteristics can be set depending on the configuration of the "Y" facing the substrate or chip.

The above exemplary embodiments can also be provided in a combined way, for example an increased core diameter in accordance with FIG. 1A can also be provided on the arms of the Y-coupler of FIG. 5 that face the substrate.

Finally, it may be pointed out that the coupling device according to the invention retains the advantages of known methods for modifying the filter curves and can also be combined with the methods already known. Thus, for example, it is possible to implement the concept of the active adjustment of the setting of the prescribed wavelengths at the output waveguides (21, 22, . . . 2n) in the case of the invention, that is to say the adjustment is performed during a transmission of light via the respective optical waveguides.

Furthermore, the solution according to the invention permits the method of passive temperature compensation, in the case of which a temperature-induced displacement of the field distribution at the input of the first free beam region is compensated by a corresponding displacement at the output of the multiplexer/demultiplexer.

The multiplexer/demultiplexer according to the invention also permits the use of already known configuration and mounting technology for the purpose of introducing the devices for coupling in and out on the substrate/chip that contains the phased array.

The invention also has the advantage that for a specific channel spacing it is necessary to use only one type of chip with a specific transmission characteristic and 1 dB bandwidth, differences in the transmission characteristic or 1 dB bandwidth being produced via the coupling device according to the invention at the chip input. A 1 dB bandwidth of 30 GHz, or a 1 dB bandwidth of 50 GHz, for example, can be set via the coupling device according to the invention. Two different chips with a different multiplexer/demultiplexer (what are termed low-loss chips and flat-top chips) was previously required to be produced in order to provide such bandwidths. The invention thereby renders it possible to attend more flexibly to the wishes of the user.

The invention is not limited in its configuration to the exemplary embodiments explained above. All that is essential for the invention is for the coupling device for coupling light into or out of the first optical free beam region to effect a flattening and/or widening of the field distribution of the light coupled in or out, at least in the plane of the free beam region.

We claim:

1. A configuration for multiplexing and/or demultiplexing signals of at least two optical wavelength channels, the configuration comprising:

an optical grating device for transforming a first optical power of each of the channels, said optical grating device having a plurality of specific separate regions of space and a specific common region of space assigned in common to all of the channels to which the first optical power is fed and transformed into a second optical power that is concentrated in each case to one said specific separate regions of space each assigned to one of the channels alone, and/or vice versa, said optical grating device containing:
an optical grating;
a first optical free beam region disposed between said specific common region of space assigned in common to all of the channels and said optical grating; and
a second optical free beam region disposed between said optical grating and each of said specific separate regions of space each assigned to one of the channels alone;

a coupling device having an optical fiber with a substantially circular core, said optical fiber forming a coupling waveguide directly coupled to said first free beam region, the coupling device being configured for coupling light into or out of all of the channels completely into said first free beam region, the light coupled in or out traversing said specific common region of space assigned in common to all of the channels, said core of said coupling device having a continuously widening cross-section effecting at least one of a flattening and a widening of a field distribution of the light coupled in or out at least in a plane of said first free beam region and projecting said at least one of the flatttening and the widening of said input field distribution of said first free beam region onto an output field distribution of said second optical free beam region; and a plurality of waveguides, one of said waveguides assigned to each of the channels alone, said waveguides coupled in each case to said second free beam region.

2. The configuration according to claim 1, wherein said coupling waveguide has a continuous enlargement of said increased core diameter in a region upstream of the coupling onto said first free beam region.

3. The configuration according to claim 1, wherein said increased core diameter is produced by at least one of heating, compressing and swelling said coupling waveguide.

4. The configuration according to claim 1, wherein said coupling device has a coupling waveguide with two parallel waveguide cores spaced apart from one another and are both coupled to said first free beam region.

5. The configuration according to claim 4, wherein said to parallel waveguide cores have a spacing of 10 to 20 μm between each other.

6. The configuration according to claim 1, wherein said coupling device has a coupling waveguide and a Y-coupler with a single end coupled to said coupling waveguide and two parallel ends coupled to said first free beam region.

7. The configuration according to claim 1, further comprising a substrate having a substrate edge, said first free beam region is disposed at said substrate edge, and said coupling device has at least one external glass fiber coupled to said substrate edge.

8. The configuration according to claim 1, wherein said coupling waveguide is a monomode glass fiber.

9. The configuration according to claim 1, wherein said optical grating contains a plurality of strip-shaped optical waveguides, said strip-shaped optical waveguides having first end faces facing said specific common region of space assigned in common to all the channels and second end faces each facing one of said specific separate regions of space to each of which one of the channels is alone assigned, and an optical length between each of said first end faces and each of said second end faces varies between said strip-shaped optical waveguides.

10. A configuration for multiplexing and/or demultiplexing signals of at least two optical wavelength channels, the configuration comprising:

an optical grating device f or transforming a first optical power of each of the channels, said optical grating device having a plurality a specific separate regions of space and a specific common region of space assigned in common to all of the channels to which the first optical power is fed and transformed into a second optical power that is concentrated in each case to one of said specific separate regions of space each assigned to one of the channels alone, and/or vice versa, said optical grating device containing:

an optical grating;

a first optical free beam region disposed between said specific common region of apace assigned in common to all of the channels and said optical grating; and a second optical free beam region disposed between said optical grating and each of said specific separate regions of space each assigned to one of the channels alone;

a coupling device for coupling light into or out of all of the channels into said first free beam region, the light coupled in or out traversing said specific common region of space assigned in common to all of the channels, said coupling device for coupling the light completely into and out of said first optical free beam region having an optical fiber forming a coupling waveguide with an elliptical core in a region of a coupling onto said first free beam region effecting at least ore of a flattening and a widening of a field distribution of the light coupled in or out at least in a plane of said first free beam region and projecting said at least one of the flattening and the widening of said field distribution of said first free beam region onto an output field distribution of said second optical free beam region, said optical fiber being directly coupled to said first free beam region; and a plurality of waveguides, one of said waveguides assigned to each of the channel alone, said waveguides coupled in each case to said second free beam region.

* * * * *